Oct. 13, 1925.

R. W. McMULLEN 1,557,071

AUTOMATIC REGULATING DEVICE FOR TANKS

Filed Feb. 12, 1925    2 Sheets-Sheet 2

Inventor

R. W. McMullen.

By

Lacey & Lacey, Attorneys

Patented Oct. 13, 1925.

1,557,071

UNITED STATES PATENT OFFICE.

ROBERT W. McMULLEN, OF BRISTOW, OKLAHOMA.

AUTOMATIC REGULATING DEVICE FOR TANKS.

Application filed February 12, 1925. Serial No. 8,748.

*To all whom it may concern:*

Be it known that I, ROBERT W. MC-MULLEN, a citizen of the United States, residing at Bristow, in the county of Creek and State of Oklahoma, have invented certain new and useful Improvements in Automatic Regulating Devices for Tanks, of which the following is a specification.

My invention relates to a device for regulating the filling of a series of tanks, and the object of the invention is to furnish an automatic closing apparatus for cutting off the flow of liquid into the tank from a main line and simultaneously opening the flow in the main line to the next tank in the series. In this manner as soon as one tank has been filled the next tank will commence to fill and all chance of overflowing in any of the tanks is prevented.

The device is of very simple construction and requires no attention, being self-operating and can be applied to the main or filling line of a series of tanks without any radical changes therein.

Figure 1:
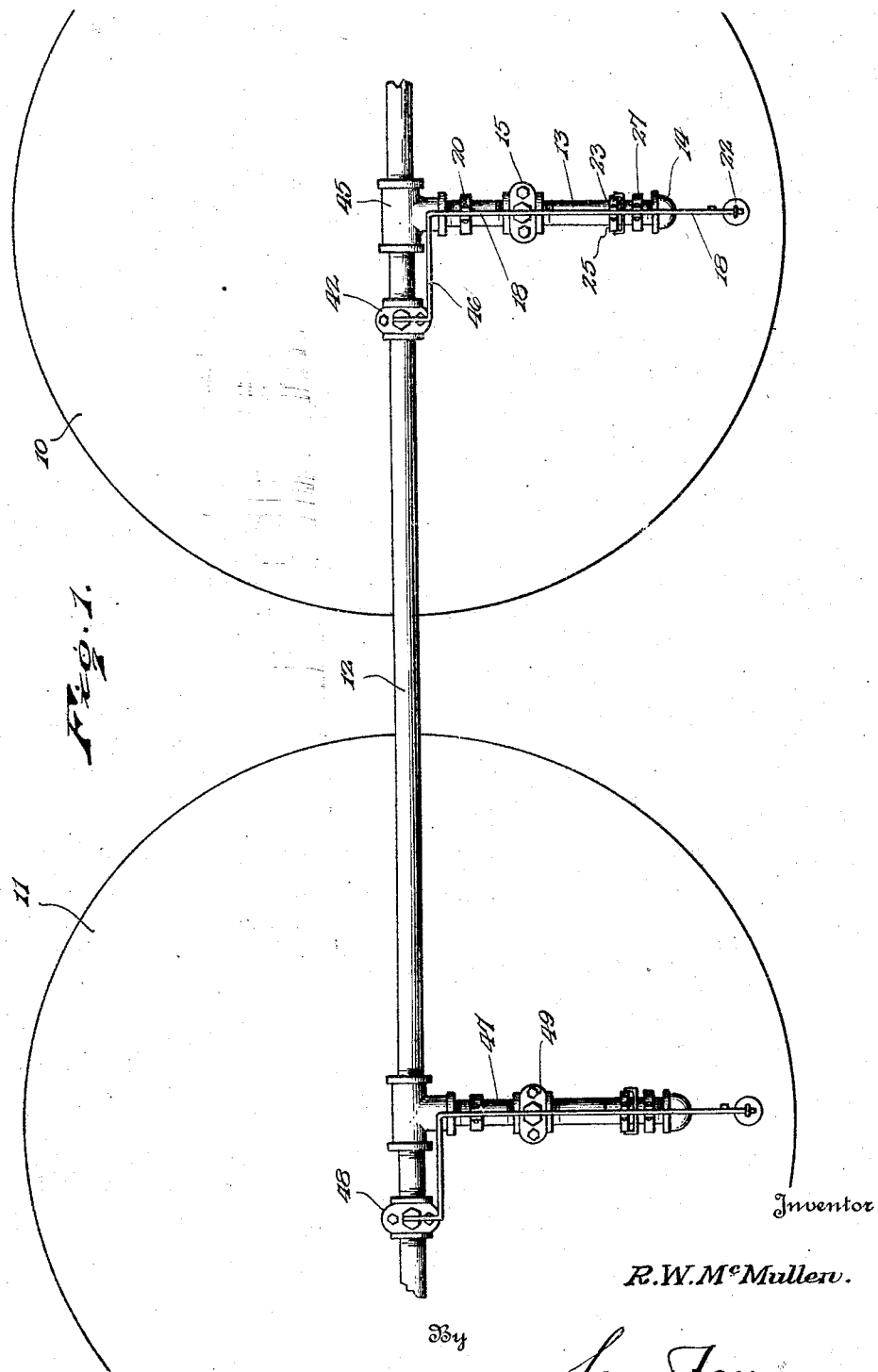
Figure 1 is a top plan view of two tanks with the device in position.

In the drawings, reference numeral 10 represents the first tank in a series of tanks, and the numeral 11 the second tank in the series. It is evident that any number of tanks may be set up and only one main line 12 is necessary for filling all the tanks. As illustrated in Figure 1, the liquid is intended to enter from the right hand end of the main pipe line 12 so as to reach the tank 10 first.

Figure 2:
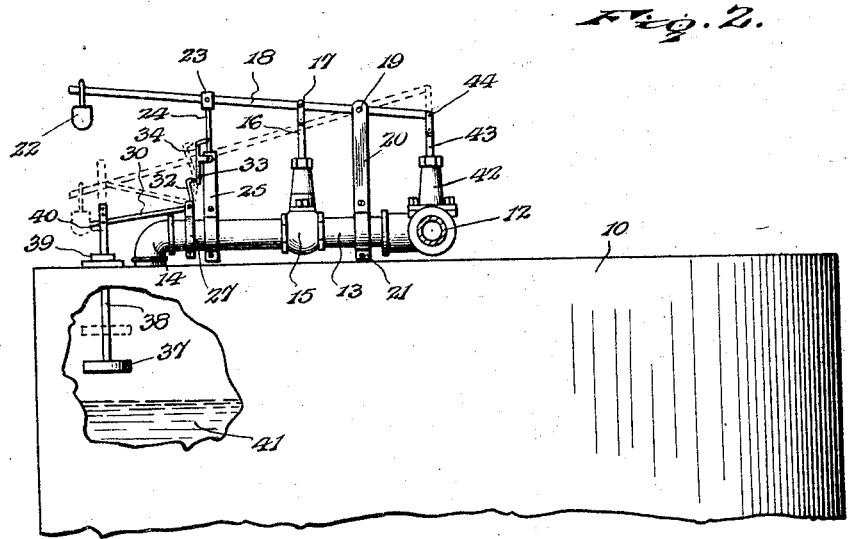
Figure 2 is a side elevation of Figure 1.

From the main line 12 is arranged a branch pipe 13 connecting therewith through a T 45, the branch pipe running preferably at right angles to the main line and having an elbow 14 at its outer end opening into the top of the tank 10, as seen in Figures 1 and 2. In this branch pipe is inserted a valve 15 actuated by a valve spindle 16 preferably extending in upright direction from the valve casing. This spindle is pivoted, as at 17, on an operating rod 18 which is fulcrumed, as at 19, on a standard 20. This standard is clamped, as at 21, to the branch pipe 13.

The operating rod 18 extends outwardly over the branch pipe 13 and at its free end is suspended a weight 22. About midway between the weight and the valve spindle 16 is pivotally connected, as at 23, a plunger 24 mounted to reciprocate in a guide 25. This guide is preferably made in two mating halves which are secured around the branch pipe 13 by means of clamping bolts 26 so that the guide 25 is kept in upright position on the branch pipe 13.

Near the elbow 14 on the branch pipe 13 is secured a bearing 27 also held in position by bolts, as at 28. In the upper end of the bearing 27 is provided a slot 29 in which is carried a trip lever or trigger 30 adapted to oscillate on a journal bolt 31. At the inner end of the trigger 30 is shown a hook 32 adapted to engage with the tail end 33 of a sear 34 mounted to oscillate, as at 50, on the upper end of the guide 25. This sear has a sharp pointed nose 35 engaging in a suitable notch 36 furnished on the plunger 24 for the purpose of holding the operating rod 18 raised, as indicated in Figure 2, and the valve 15 open.

Reference numeral 37 represents a float (preferably of aluminum to avoid rusting) carried on a stem 38 and depending a suitable distance into the tank 10, in the top of which the stem 38 is guided, as at 39. The upper end of the stem 38 is provided with a plurality of apertures 40 adapted to engage a pivot pin carried at the free end of the trigger 30, as best seen in Figure 2. These apertures are provided in order that a suitable adjustment may be obtained between the float 37 and the trigger 30 in accordance with the amount of liquid to be filled into the tank 10.

Figures 3, 4:
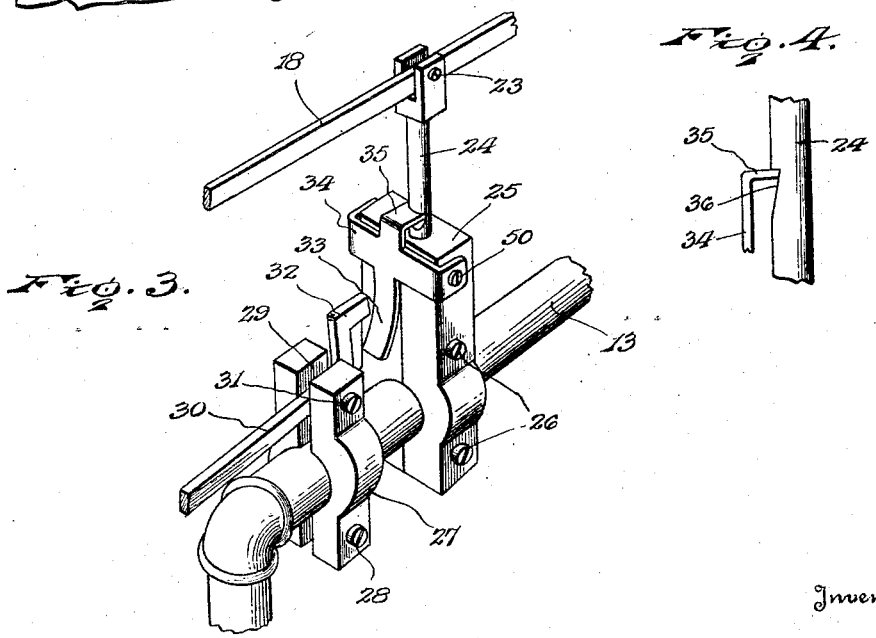
Figure 3 is a perspective view of some of the details of the device.
Figure 4 is a detail of the means for holding the operating rod in raised position.

During the filling of this tank and before the liquid, indicated by the reference numeral 41, has reached the float 37, the parts take the position indicated in Figures 2 and 3, that is to say, the weighted end of the operating rod 18 is swung upwardly around its fulcrum 19 thereby holding the valve 15 open. The operating rod is held in this position by means of the nose 35 of the sear 34 engaging in the notch 36 of the plunger 24. The weight 22 is thus actually supported by the sear 34. The trigger 30 is now inclined downwardly from its journal bolt 31 so that the hook 32 is retracted from the tail 33 of the sear 34. As soon as the liquid has risen to the level of the float 37, and the latter begins to travel upwardly, the stem 38 will actuate the trigger 30 so that the hook 32 will swing forwardly to contact with the tail 33 and trip the sear 34. As the nose 35 of the sear leaves the notch 36 in the plunger 24, the latter will be free to descend in the guide 25 actuated by the weight 22 at the end of the operating rod 18, and the stem 16 will travel downwardly in the valve casing and close the valve 15. This shuts off the branch pipe 13 from the main pipe 12 and no more liquid will run into the tank 10.

A second valve 42 is furnished on the main line 12, as best seen in Figure 1. This valve is similar in construction to the valve 15 on the branch pipe 13. It has also a valve stem 43 which has pivotal engagement, as at 44, with the inner end of the operating lever 18. As the valve 42 of necessity has to be positioned slightly to the left of the T 45 connecting the main pipe 12 with the branch pipe 13, the operating rod 18 has an off-set 46 to which the valve stem 43 is connected.

As the standard 20, in which the operating rod 18 is fulcrumed, is placed approximately midway between the two valves 15 and 42 in transverse direction of the tank, as seen in Figure 2, the valve stems 16 and 43 will have the same stroke so that when the valve stem 16 travels downwardly to close the valve 15, the valve stem 43 simultaneously travels upwardly the same distance and opens the valve 42. In this manner liquid in the main pipe instead of being switched off to the branch pipe 13 will continue along the main pipe 12 to the second tank 11 and fill the same in a similar manner as that already described with regard to the tank 10. For this purpose a branch pipe 47 is furnished from the main pipe 12 for the tank 11 and a device similar to that furnished for the tank 10 is supplied on this branch pipe for this second tank. When the valve 42 is open the corresponding valve 48 remains closed and the branch pipe valve 49 stands open as indicated in Figures 2 and 3. As soon as the second tank 11 has been filled, the float therein rises and closes the branch valve 49, simultaneously opening the valve 48 so that the liquid continues along the main pipe to the third tank in the series. This is repeated along the whole series of tanks.

It is evident that the liquid flows under pressure in the main pipe. This is accomplished in any suitable manner, as for example, by a pump or the like.

Having thus described the invention, what is claimed as new is:

1. In a construction of the character described, a main pipe, a branch pipe leading from said main pipe, a valve in said main pipe having an operating stem extending transversely out of the pipe, a valve in said branch pipe having an operating stem extending transversely out of the pipe, a fulcrum carried by said branch pipe between its valve and said main pipe, a lever pivoted to said fulcrum and extending longitudinally of the branch pipe and pivotally connected with the stems of said valves, float controlled means for releasably securing said lever in a set position with one valve closed and the other open, and means for imparting movement to said lever to reverse the positions of the valves when the lever is released.

2. In a construction of the character described, a main pipe, a branch pipe leading from said main pipe, a valve in said main pipe having an operating stem extending transversely out of the pipe, a valve in said branch pipe having an operating stem extending transversely out of the pipe, a fulcrum carried by said branch pipe between its valve and said main pipe, a lever pivoted to said fulcrum and extending longitudinally of the branch pipe and having one end portion pivotally connected with the stem of the valve of said branch pipe and its other end portion bent to extend longitudinally of said main pipe and pivotally connected with the stem of the valve of the main pipe, means for releasably securing said lever in a set position with one valve open and the other closed and including a control float adapted to extend into a receptacle to be filled from said branch pipe, and means for imparting movement to said lever to reverse the positions of the valves when the float controlled means is moved to release the lever.

3. In a construction of the character described, a main pipe, a branch pipe leading therefrom, a valve for said main pipe beyond its communication with said branch pipe, a valve for said branch pipe, a fulcrum carried by said branch pipe between its valve and said main pipe, a lever pivoted to said fulcrum and extending longitudinally of said branch pipe and connected with said valves for imparting movement to the valves in opposite directions when moved, means for releasably receiving said lever in a set position with one valve open and the other shut and including a control float adapted to extend into a receptacle to be filled from the branch pipe, and means for imparting movement to said lever to reverse the positions of said valves when said float controlled means is moved to release the lever.

4. In a construction of the character described, a main pipe, a branch pipe leading therefrom, a valve for said main pipe beyond its communication with said branch pipe, a valve for said branch pipe, a fulcrum carried by said branch pipe between its valve and said main pipe, a lever pivoted to said fulcrum and extending longitudinally of said branch pipe and connected with said valves for imparting movement to the valves in opposite directions when moved, a guide carried by said branch pipe, a latch carried by said guide, an arm carried by said lever and slidably engaged with said guide and adapted to be engaged by said latch to releasably secure said lever in a set position with one valve open and the other closed, a trigger movably mounted adjacent said latch, and a rod carried by said trigger and adapted to extend into a receptacle to be filled from said branch pipe and carrying a float whereby the trigger may be actuated to move said latch to a position to release said arm and permit said lever to return to its normal position and return the valves to their normal positions.

In testimony whereof I affix my signature.

ROBERT W. McMULLEN. [L. S.]